United States Patent
Ono et al.

[11] Patent Number: 5,957,561
[45] Date of Patent: Sep. 28, 1999

[54] SURFACE LIGHT SOURCE DEVICE OF SIDE LIGHT TYPE AND DISPLAY

[75] Inventors: Toshiaki Ono, Akishima; Manabu Takashio, Kawaguchi; Tsuyoshi Ishikawa, Tokyo, all of Japan

[73] Assignee: Enplas Corporation, Kawaguchi, Japan

[21] Appl. No.: 08/944,551

[22] Filed: Oct. 7, 1997

[30] Foreign Application Priority Data

Oct. 11, 1996 [JP] Japan .................................. 8-289234
Jul. 31, 1997 [JP] Japan .................................. 9-220151

[51] Int. Cl.$^6$ ............................................. F21V 13/12
[52] U.S. Cl. ............................ 362/31; 362/26; 362/343; 362/351
[58] Field of Search ............................... 362/26, 27, 30, 362/31, 330, 343, 351, 360; 349/62, 65

[56] References Cited

U.S. PATENT DOCUMENTS

| | | | |
|---|---|---|---|
| 3,957,351 | 5/1976 | Stockwell | 349/62 |
| 5,038,259 | 8/1991 | Katoh et al. | 362/343 |
| 5,216,411 | 6/1993 | Ashitomi et al. | 349/65 |
| 5,504,605 | 4/1996 | Sakuma et al. | 349/62 |
| 5,654,779 | 8/1997 | Nakayama et al. | 362/31 |
| 5,677,746 | 10/1997 | Yano | 349/65 |

*Primary Examiner*—Alan Cariaso
*Attorney, Agent, or Firm*—Staas & Halsey

[57] ABSTRACT

In a surface light source device of side light type and a display employing the same, illumination light of high grade is allowed to emit by reducing irregularities in luminance caused along a muntin of a support member to support components such as a light guide plate 2 and a reflection sheet 21. A light quantity correction surface 21A is formed between the reflection member 21 and a support member 11. Otherwise, a member providing the light quantity correction surface is arranged on the rear of the support member. A quantity of illumination light in a portion of a muntin 11B of the support member 11 is made approximately equal to that in a portion of an aperture 11C, and the irregularities in luminance caused correspondingly to the muntin are reduced. The light quantity correction surface may be provided by a surface of the muntin itself or ink coated on the muntin by means of printing. Further, a member providing the light quantity correction surface may be arranged between the muntin and the reflection member 21. This member may be an additional reflection sheet.

26 Claims, 7 Drawing Sheets

FIG. 1

20, (40): SURFACE LIGHT SOURCE DEVICE OF SIDE LIGHT TYPE

30, (50): SURFACE LIGHT SOURCE DEVICE OF SIDE LIGHT TYPE

FIG. 5

60: LIQUID CRYSTAL DISPLAY

FIG. 6

70: SURFACE LIGHT SOURCE
DEVICE OF SIDE LIGHT
TYPE

FIG. 7
(Prior Art)

1: SURFACE LIGHT SOURCE DEVICE OF SIDE LIGHT TYPE

FIG. 8

(Prior Art)

SURFACE LIGHT SOURCE DEVICE OF SIDE LIGHT TYPE AND DISPLAY

BACKGROUND

1. Field of Invention

This invention relates to a surface light source device of side light type and a display employing the same, and more particularly, to a surface light source device of side light type and a display, which achieve a reduction of irregularities in luminance. The present invention is applied to a backlighting arrangement in a liquid crystal display panel, for instance, and provides a liquid crystal display of high display quality.

2. Related Art

It is a matter of common knowledge that a surface light source device of side light type provides a thin backlighting arrangement to illuminate a liquid crystal display panel. In general, the surface light source device of side light type has a light guide plate in the form of a plate-like member made of a light guiding material, and a primary light source including a rod-shaped light source to supply illumination light to the light guide plate through a lateral side thereof.

Illumination light emitted from the primary light source is introduced into the light guide plate through an end surface of the light guide plate. The introduced illumination light is deflected and then emitted toward a liquid crystal display panel through one of major surfaces of the light guide plate. Since the primary light source is arranged on the lateral side of the light guide plate, it is possible to easily provide a device of thin type on the whole.

A well-known light guide plate employed in the surface light source device of side light type as described above is classified into a light guide plate of a type which is approximately uniform in thickness, and a light guide plate of a type which shows a tendency to decrease a thickness according as to remoting from the primary light source. In general, the light guide plate of the latter type emits illumination light more efficiently than the light guide plate of the former type.

Figure 7:
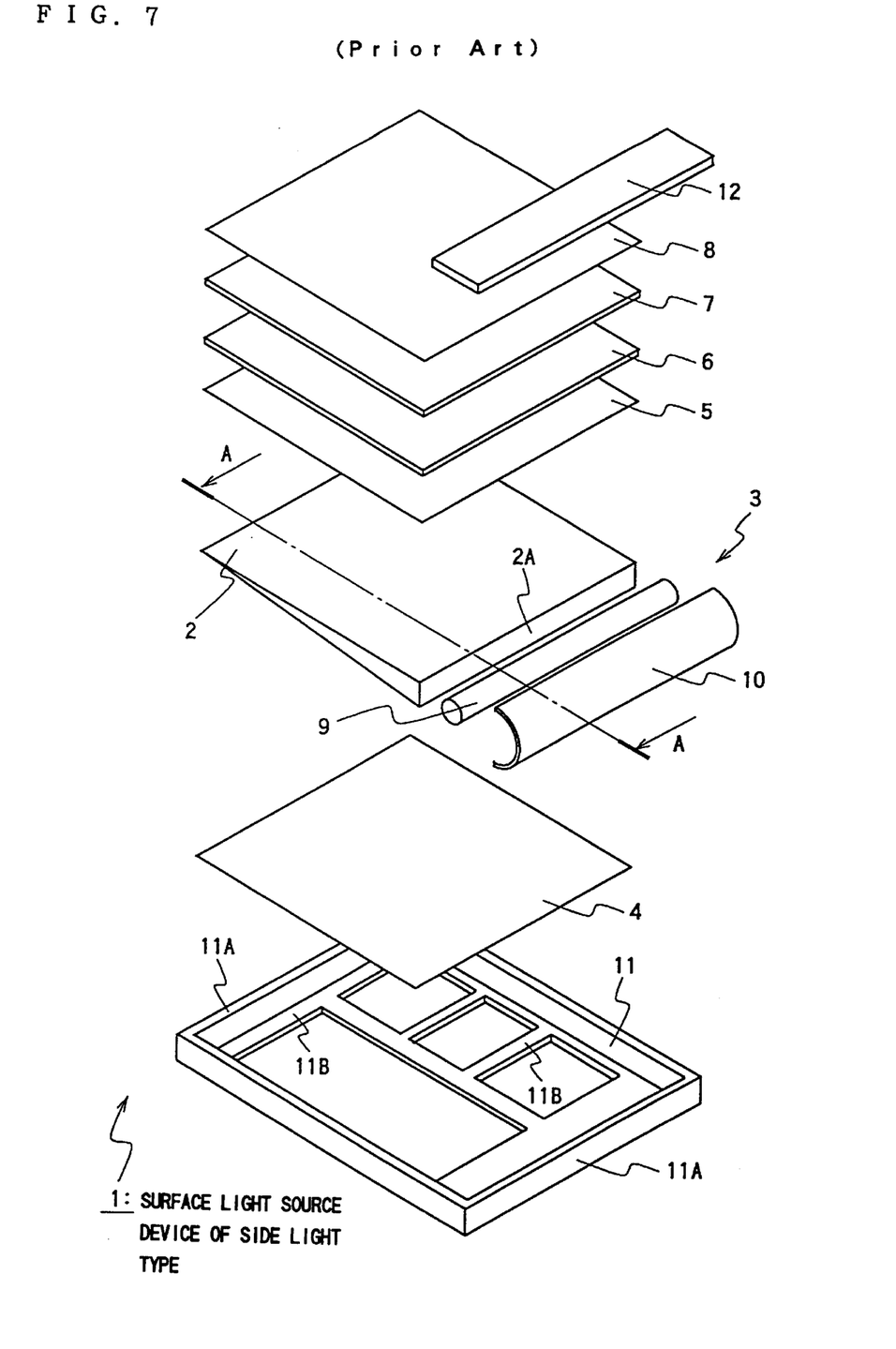
FIG. 7 is an exploded perspective view showing a surface light source device of side light type in a prior art.
Figure 8:
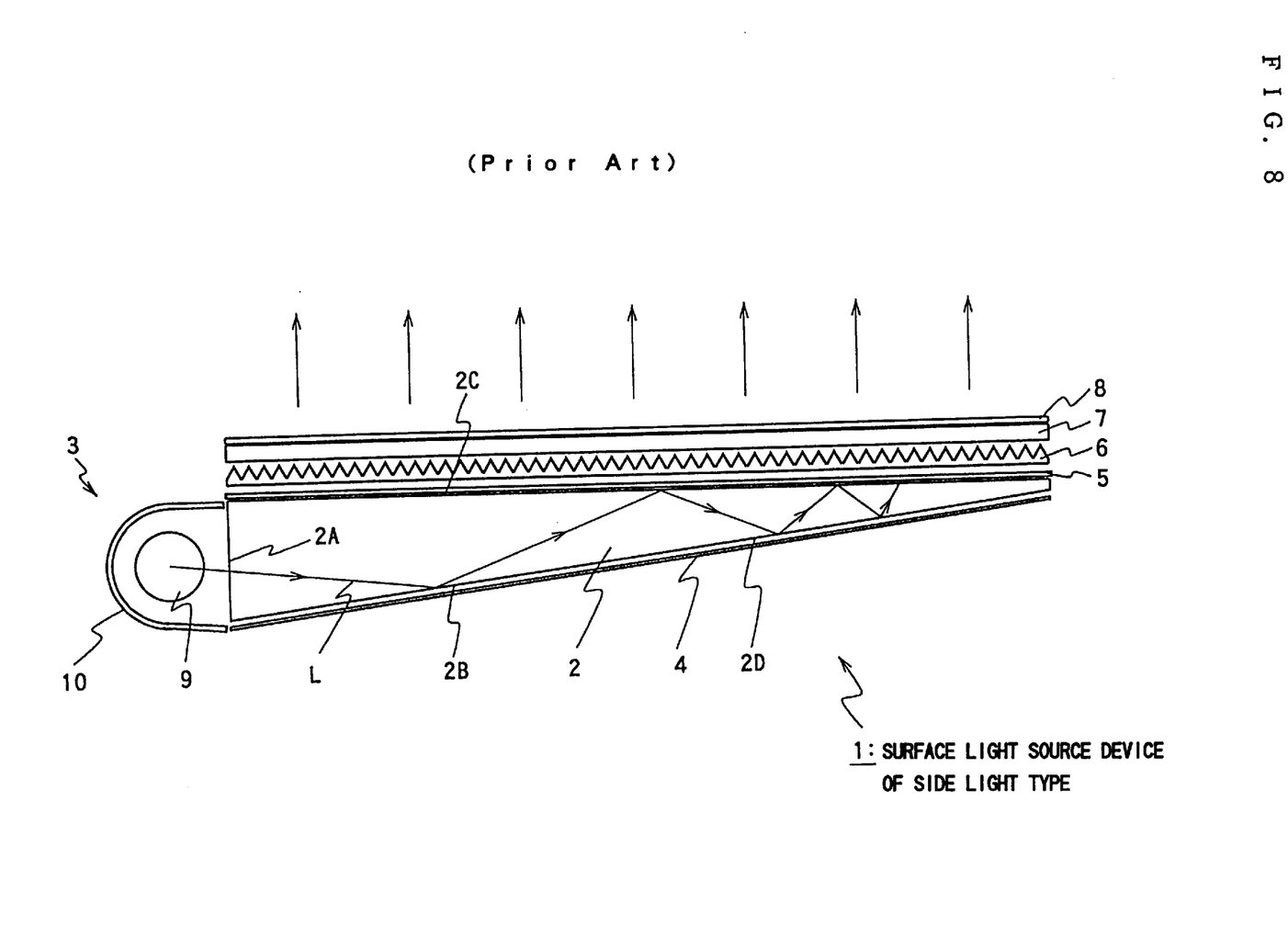
FIG. 8 is a sectional view taken along a line A—A in FIG. 7.

FIG. 7 is an exploded perspective view showing a surface light source device of side light type employing the light guide plate of the latter type. FIG. 8 is a sectional view taken along a line A—A in FIG. 7. Referring to FIGS. 7 and 8, a surface light source device of side light type 1 has a light guide plate 2, and a primary light source 3 is arranged on the lateral side of the light guide plate. The surface light source device 1 further has a reflection sheet 4, a diffusible sheet 5, prism sheets 6, 7 functioning as light control members, and a protection sheet 8 of low diffusibility, and these components are laminatedly arranged together with the light guide plate 2 as shown in FIG. 8.

The primary light source 3 has a cold cathode tube (a fluorescent lamp) 9 and a reflector 10 surrounding the cold cathode tube. The reflector 10 has an aperture, through which illumination light is supplied to an end surface 2A of the light guide plate 2. The reflector 10 is made of a regular reflective or diffuse reflective sheet material or the like. The light guide plate 2 having a wedge-shaped section is made of an acrylic material (PMMA resin), for instance, by means of injection molding. The light guide plate 2 receives the illumination light from the primary light source 3 through one end surface serving as an incidence surface 2A.

In the light guide plate 2, the illumination light makes a propagation while undergoing repetitive reflection between a major surface (which will be hereinafter referred to as "slope") 2B, along which the reflection sheet 4 is disposed, and a different major surface (which will be hereinafter referred to as "emitting surface") 2C, along which the diffusible sheet 5 is disposed.

Every time reflection occurs, a component of light incident at an angle of not more than a critical angle is emitted through the slope 2B and the emitting surface 2C. Accordingly, the illumination light emitted through the emitting surface 2C makes a main propagation inclined toward the wedge end. This phenomenon is called emitting directivity.

Further, a diffusible surface 2D is formed on the slope 2B. The diffusible surface 2D is provided with diffusibility which steps up from the side of the incidence surface 2A toward the wedge end. The diffusibility is provided by means of coating the slope with diffusible ink containing a pigment consisting of magnesium carbonate, titanium oxide or the like, for instance. The degree of diffusibility can be adjusted according to a quantity of diffusible ink coated on the slope.

The slope 2B may be also provided with diffusibility by means of matting (roughening) the slope 2B, instead of coating the slope with the diffusible ink. In this case as well, such diffusibility as steps up from the side of the incidence surface 2A toward the wedge end is provided. Thus, matted surface areas of a rectangular shape, for instance, are formed in a distributed state at a certain or random pitch so that the density of distributed areas steps up from the side of the incidence surface 2A toward the wedge end.

The light guide plate 2 described above corrects a quantity of output light decreased in the vicinity of the wedge end, and makes the distribution in quantity of output light uniform. It is to be noted that the diffusibility described above is not so intensive as the light guide plate is allowed to lose the emitting directivity. That is, even if the diffusibility is provided to the slope 2B, the illumination light emitted through the emitting surface 2C is inclined to mainly toward the wedge end.

The reflection sheet 4 is made of a sheet-like regular reflective member consisting of metal foil or the like, or a sheet-like diffuse reflective member consisting of a white PET film or the like. Illumination light leaking out of the slope 2B is incident again onto the light guide plate 2 after having been reflected by the reflection sheet 4, resulting in improvement of efficiency of illumination light utilization.

The prism sheets 6, 7 are arranged to correct the emitting directivity of the light guide plate 2. The diffusible sheet 5 is arranged to prevent the diffusible surface 2D on the slope 2B from being visibly observed from above the emitting surface 2C, and further to make highlight and shadow or the like in each part of the light guide plate 2 illuminated with the illumination light less noticeable.

The diffusible sheet 5 diffuses the illumination light emitted through the light guide plate 2. The prism sheets 6, 7 are made of a light-transmitting sheet material such as polycarbonate. In each prism sheet, a surface (an outside surface) with its back to the light guide plate 2 is formed as a prism surface. The prism surface is composed of a large number of projections, which are triangular in sectional shape and run approximately parallel in one direction. In the shown case, the projections on the inside prism sheet 6 are oriented such as to run along the incidence surface 2A, while the projections on the prism sheet 7 are oriented such as to run in a direction orthogonal to the incidence surface 2A.

The prism sheets 6, 7 correct a main emitting direction of output light with a slope of each projection so as to emit the output light in a frontal direction of the emitting surface 2C.

It may be also possible to use a so-called double-faced prism sheet having both surfaces respectively serving as prism surfaces.

In general, the surface light source device of side light type employing the wedge-shaped light guide plate and the prism sheets as described above may emit output light in the frontal direction more efficiently than a surface light source device of side light type employing a light guide plate which is substantially uniform in thickness.

The protection sheet 8 protects a surface of the prism sheet 7 from damage or the like, and relieves the directivity of output light corrected by the prism sheets 6, 7 to enlarge an angle of visual field. Accordingly, the illumination light may be emitted to a desired extent in the frontal direction of the emitting surface.

The surface light source device of side light type 1 (See FIG. 7) having the above basic structure has a frame 11. Various components including the light guide plate 2 and a liquid crystal display panel are arranged in sequence on the frame 11, and are supported thereto. The frame 11 is made of a white resin of high reflectance, which efficiently reflects illumination light, by means of injection molding. The frame 11 is composed of a thin plate-like side plate 11A to surround the lateral side of the surface light source device of side light type 1 and a bottom to close up the side plate 11A.

The bottom has a thin plate-like muntin 11B fringing the slope side of the light guide plate 2 and connected to the side plates 11A at a predetermined position. The muntin 11B of the frame 11 decreases deformation in molding. Further, in the frame 11, the muntin 11B projects downward at a predetermined position as shown in the drawing. A tapped hole is formed in this projected portion, and a drive substrate (not shown) of the liquid crystal display panel or the like is supported on the rear side by the use of this tapped hole, so that the structure of the frame secures sufficient strength and holds the total weight down.

In assembly, various components such as the reflection sheet 4, the light guide plate 2, the primary light source 3, the diffusible sheet 5, the prism sheets 6, 7 and the protection sheet 8 or the like are housed in sequence at predetermined positions in the frame 11. A rod-like support member 12 is arranged on the outermost side (on the side of the protection sheet 8), and the above components are supported more fixedly with this support member.

When observation of the above well-known surface light source device of side light type 1 is carefully made from above the emitting surface, irregularities in luminance resulting from partial intensification of a luminance level are sensed in an area corresponding to the muntin 11B of the frame 11. If it is possible to achieve a reduction of the above irregularities in luminance, output light from the surface light source device will be graded up, and the display employing this surface light source device will be improved in display quality.

OBJECT AND SUMMARY OF INVENTION

An object of the present invention is to provide a surface light source device of side light type and a display, which enable a reduction of irregularities in luminance caused in an area of an emitting surface arranged along a muntin of the frame in the above basic structure.

The present invention is applied to a surface light source device of side light type including the above basic structure and also a display employing such a surface light source device.

That is, the present invention is applied to a surface light source device of side light type, which comprises a light guide plate having an emitting surface as one of major surfaces, a primary light source to supply light to the light guide plate through a lateral side thereof so as to allow light to emit through the emitting surface, a reflection sheet member arranged along a surface opposite to the emitting surface of the light guide plate and having a function to return light, which leaks out of the light guide plate through its surface opposite to the emitting surface, to the light guide plate, and a support member including side plates to surround the lateral side of the light guide plate and a muntin connected to the side plates so as to support the light guide plate and the reflection member, or to a display employing the above surface light source device for backlighting.

According to the features of the present invention, a light quantity correction surface is provided to prevent irregularities in luminance from occurring on an emitting surface correspondingly to a muntin. The light quantity correction surface corrects at least one of a quantity of illumination light, which is transmitted through the reflection member and is then allowed to return to the light guide plate after having been reflected by the muntin, and a quantity of illumination light, which is allowed to return to the light guide plate without being reflected by the muntin, so as to allow the light leaking out of the light guide plate to uniformly return to the light guide plate.

The light quantity correction surface may be formed by coating a surface of the reflection sheet member on the side of the muntin with ink of high absorptance by means of printing. Further, the ink may be selectively coated by means of printing in correspondence to the muntin.

It is also possible to provide a muntin made of a member of high reflectance, and to form the light quantity correction surface by coating a surface of the muntin on the side of the reflection sheet with ink of high absorptance by means of printing. It is also possible to provide a muntin made of a member of high reflectance, and to form the light quantity correction surface by interposing a sheet-like member of high absorptance between the reflection sheet and the muntin. This sheet-like member may have partially high absorptance.

Further, it is also possible to provide a muntin made of a member of low reflectance, and to form the light quantity correction surface by coating a surface of the reflection sheet on the side of the muntin with ink of high reflectance by means of printing. The ink may be selectively coated by means of printing in correspondence to the muntin.

Further, it is also possible to provide a muntin made of a member of low reflectance, and to form the light quantity correction surface by coating a surface of the muntin on the side of the reflection sheet with ink of high reflectance by means of printing.

Further, it is also possible to provide a muntin made of a member of low reflectance, and to form the light quantity correction surface by interposing a sheet-like member of high reflectance between the reflection sheet and the muntin. The sheet-like member may have partially high reflectance.

The surface of the muntin itself may also provide a light quantity correction surface. Further, when, in addition to the above reflection sheet member, another reflection sheet member is arranged on the side close to the muntin, this additional reflection sheet member may also provide the light quantity correction surface.

Hereinafter, a better understanding of the features of the present invention will be given with reference to the accompanying drawings.

EMBODIMENTS (1) First embodiment

Figure 1:
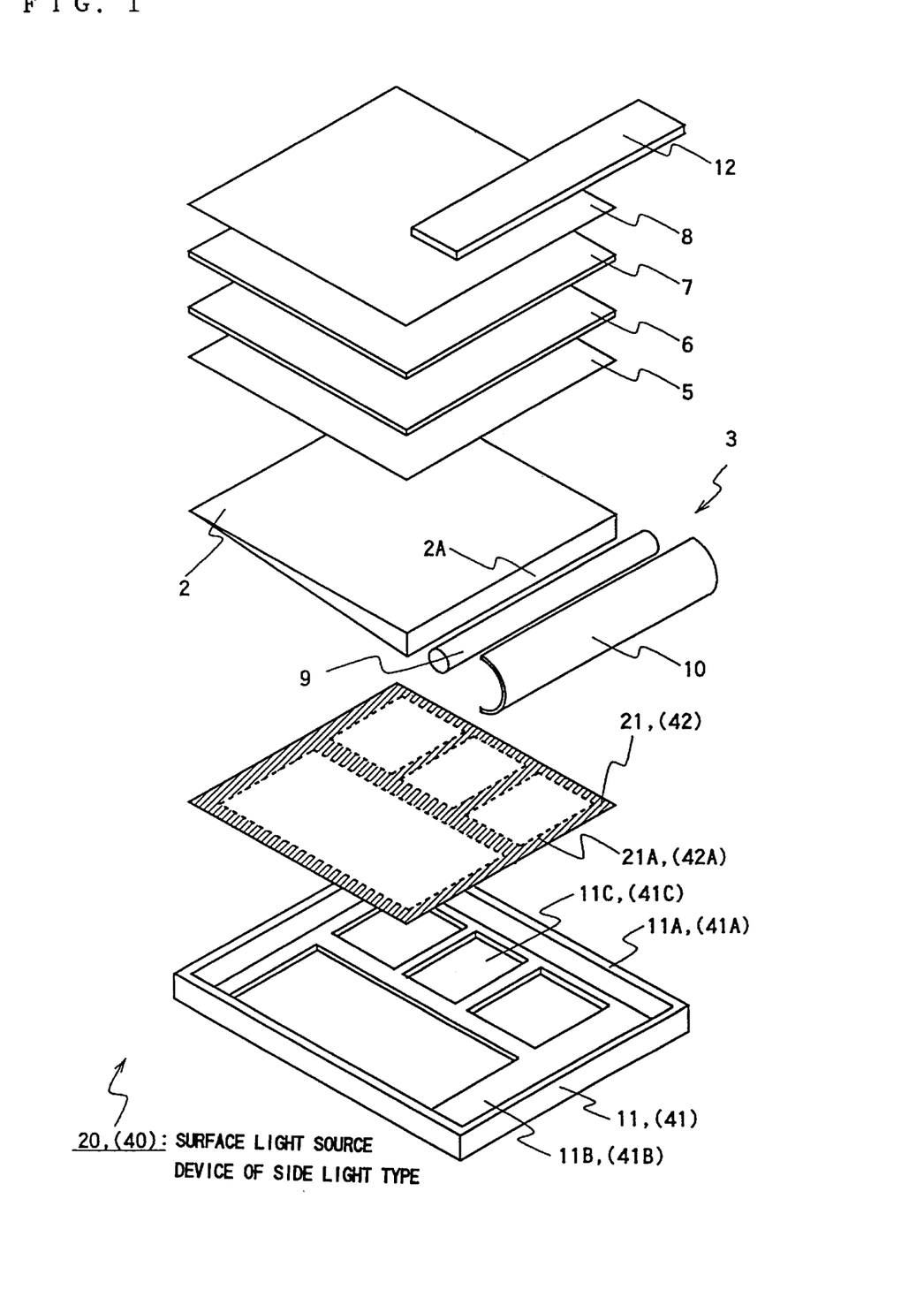
FIG. 1 is an exploded perspective view showing a surface light source device of side light type according to the first and fourth embodiments of the present invention.

FIG. 1 shows a surface light source device of side light type according to the first embodiment in the form similar to that in FIG. 7. A surface light source device of side light type 20 comprises a frame 11, and various components including a reflection sheet 21 serving as a reflection member and a light guide plate 2 are arranged on the frame 11. The frame 11 is made of a white resin of high reflectance, which efficiently reflects illumination light, and is made by means of injection molding, similar in shape to that in the prior art. On the other hand, the reflection sheet 21 is made of a sheet-like diffuse reflective member consisting of a white PET film or the like, and has a light quantity correction surface partially coated with gray ink 21A of low reflectance by means of printing.

Figure 2:
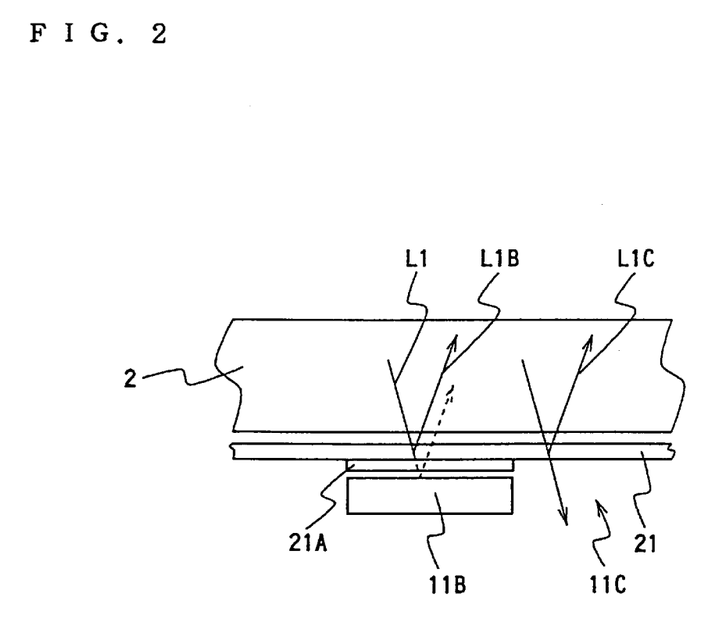
FIG. 2 is a sectional view for explaining the action of the surface light source device of side light type shown in FIG. 1.

As shown in FIG. 2, the gray ink 21A is selectively coated by means of printing on a surface of the reflection sheet 21 opposite to the light guide plate 2 so that an ink-coated portion overlaps with a muntin 11B of the frame 11. In general, the reflection sheet 21 itself shows a small transmittancy as it is. The gray ink 21A is effective in reducing the transmittancy of the reflection sheet 21 to partially shield illumination light incident onto the reflection sheet 21, and as a result, decreases a quantity of light incident onto the light guide plate 2 after having been reflected by the muntin 11B of the frame 11.

Illumination light emitted from a fluorescent lamp 9 is introduced into the light guide plate 2 through an incidence surface 2A directly or after having been reflected by the reflector 10. The introduced illumination light makes a propagation while undergoing repetitive reflection between a slope and an emitting surface. Every time reflection occurs on the slope, an angle of incidence with respect to the emitting surface is decreased. A component of light incident onto the emitting surface at an angle of not more than a critical angle is emitted through the emitting surface.

After the illumination light emitted through the emitting surface has been transmitted through the diffusible sheet 5, the directivity of the illumination light is corrected by prism sheets 6, 7 and a protection sheet 8. A liquid crystal display panel or the like is arranged on the outside of the protection sheet 8 and is illuminated from the rear. As described above, an angle of incidence with respect to the slope is also decreased every time internal reflection occurs, and the illumination light emitted through the emitting surface is inclined to mainly make a propagation toward an end of the wedge-shaped light guide plate (emitting directivity).

On the other hand, the angle of incidence with respect to the slope is also decreased every time internal reflection occurs, while a diffusible surface formed on the slope scatters the illumination light, and as a result, the leakage of light out of the slope occurs. As shown in FIG. 2, although most of illumination light L1 leaking out of the slope is allowed to return to the inside of the light guide plate 2 after having been diffusely reflected by the reflection sheet 21 arranged along the slope, part of the illumination light leaking out of the slope tends to be transmitted through the reflection sheet 21.

In the embodiment of the present invention, part of the illumination light having been transmitted through the reflection sheet 21 is shielded by the gray ink 21A, so that a quantity of illumination light L1B allowed to return to the inside of the light guide plate 2 in a portion of the muntin 11B is held to be approximately equal to a quantity of illumination light L1C allowed to return to the inside of the light guide plate 2 in a portion of an aperture 11C, avoiding irregularities in luminance effectively. As described above, according to the embodiment of the present invention, it is possible to avoid the irregularities in luminance, which would be caused in an area corresponding to the muntin 11B, by the action of the light quantity correction surface provided on the reflection sheet (the reflection member).

If the reflection sheet 21 is not provided with the above light quantity correction surface, a considerable quantity of light is reflected by the muntin 11B of the frame 11 under the influence of the transmittancy of the reflection sheet 21, and is then allowed to return to the inside of the light guide plate 1 after having been transmitted through the reflection sheet 21 again. This phenomenon does not occur in an area (a portion of the aperture 11C between the muntins 11B) including no muntin 11B. Hence, it follows that the irregularities in luminance are caused in an area corresponding to the muntin 11B. Incidentally, the following embodiments are given on condition that the reflection sheet 21 has transmittancy, as a matter of course.

(2) Second embodiment

Figure 3:
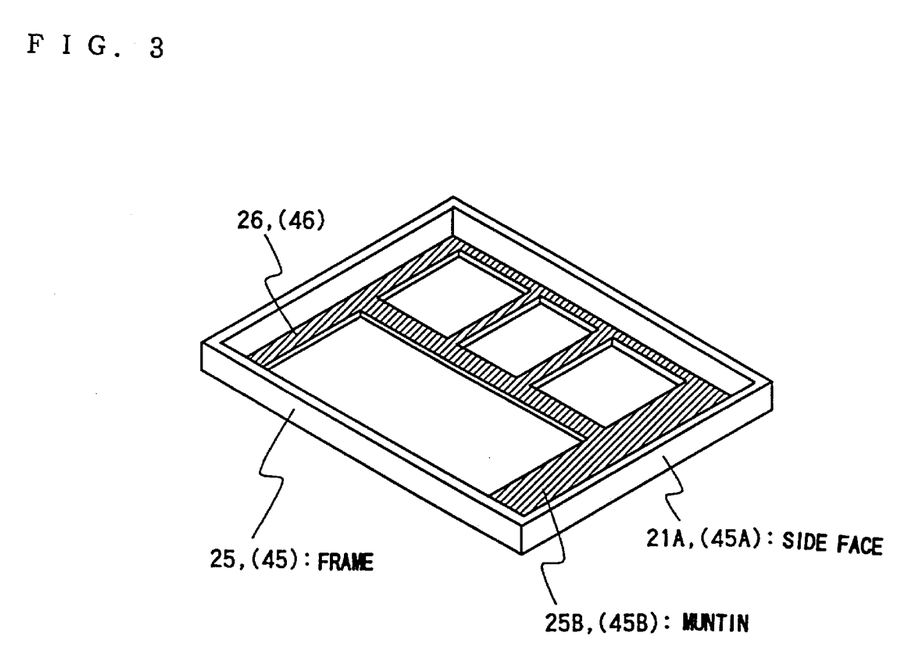
FIG. 3 is a perspective view showing a frame applied to a surface light source device of side light type according to the second and fourth embodiments of the present invention.

FIG. 3 is a perspective view showing a frame applied to a surface light source device of side light type according to the second embodiment of the present invention. In the surface light source device of side light type in the second embodiment, a frame 25 is employed, instead of the frame 11 employed in the arrangement shown in FIG. 1. This frame 25 is similar in shape to the frame 11 described above, and is made of a white resin by means of injection molding.

The frame 25 has a muntin 25B. Gray ink 26 is coated on a surface of the muntin 25B facing the light guide plate 2 by means of printing, providing a light quantity correction surface functioning as a light absorbable surface.

Part of light leaking out of the slope of the light guide plate is incident onto the muntin 25B after having been transmitted through a reflection sheet. However, a considerable part of light incident onto the muntin 25B is absorbed by the gray ink 26. As a result, a quantity of light allowed to return to the inside of the light guide plate 2 after having been reflected by the muntin 25B is decreased. As described above, according to the second embodiment of the present invention, it is possible to avoid the irregularities in luminance, which would be caused in an area corresponding to the muntin 25B, by the action based on light absorption in the light quantity correction surface formed on the muntin 25B itself.

(3) Third embodiment

Figure 4:
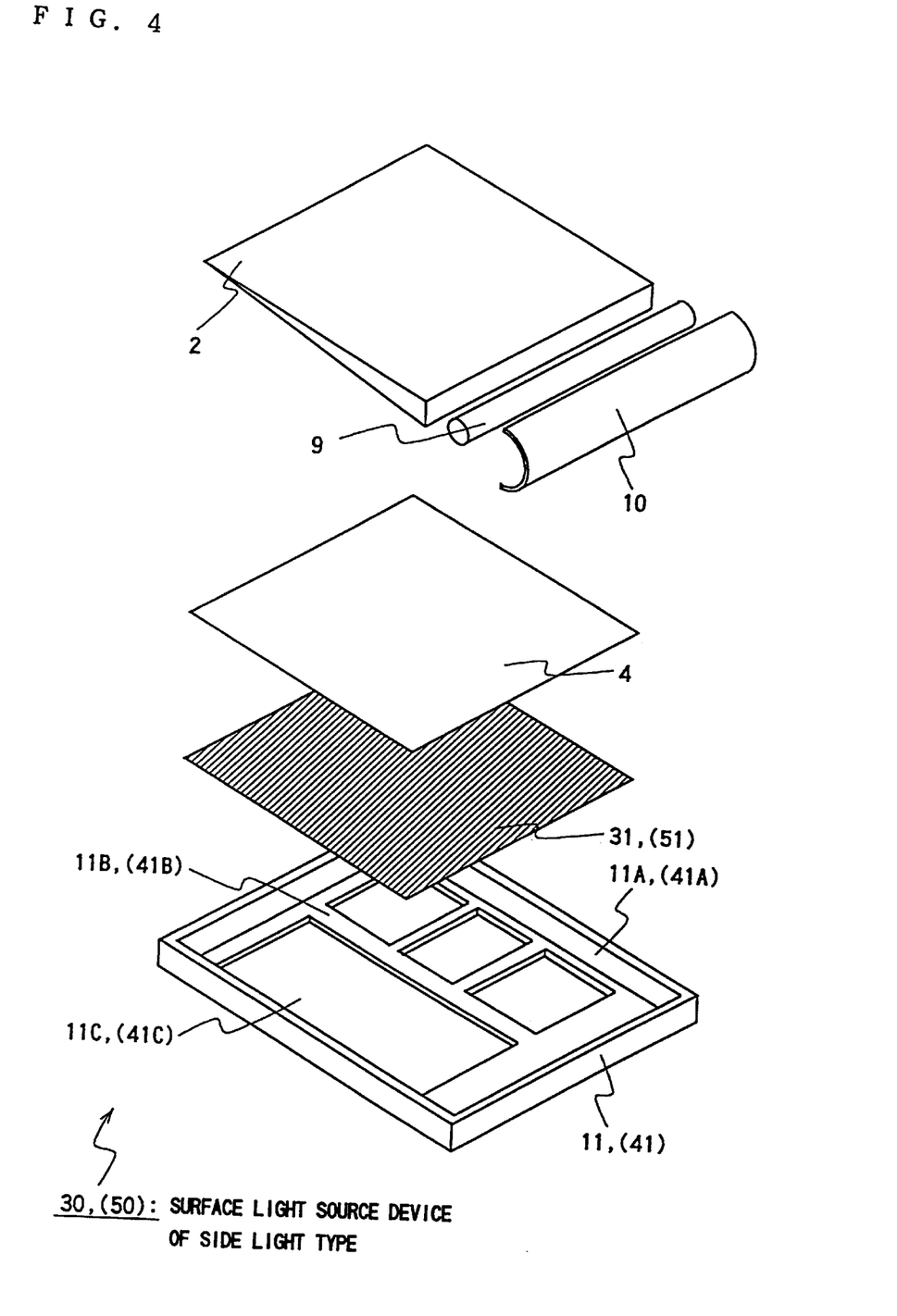
FIG. 4 is an exploded perspective view showing a surface light source device of side light type according to the third and fourth embodiments of the present invention.

FIG. 4 is an exploded perspective view showing a surface light source device of side light type according to the third embodiment of the present invention. Referring to FIG. 4, descriptions of various components such as prism sheets or the like arranged along an emitting surface of a light guide plate 2 are omitted. Further, the components employed in common to the arrangements shown in FIGS. 4 and 7 are designated by the same reference numerals, and descriptions thereof are omitted to avoid repetition.

According to the features of the third embodiment of the present invention, a surface light source device of side light type 30 comprises a light quantity correction sheet 31 interposed between a reflection sheet 4 and a frame 11. The reflection sheet 4 and the frame 11 similar to those used in the prior art shown in FIG. 7 may be also used in the third embodiment.

The light quantity correction sheet 31 is made of a black sheet material of high absorptance, and absorbs illumination light having been transmitted through the reflection sheet 4. The light quantity correction sheet 31 substantially prevents illumination light from being incident again onto the light guide plate 2 even in a portion corresponding to any of the muntin 11B and the aperture 11C. Light capable of being transmitted through the light quantity correction sheet 31 is very small in quantity, so that even if reflection of light by the muntin 11B occurs, there is no great difference between a quantity of illumination light allowed to return from an aperture portion between the muntins 11B to the light guide plate 2 and a quantity of illumination light allowed to return to the light guide plate after having been reflected by the muntin 11B. As described above, according to the third embodiment of the present invention, it is possible to avoid the irregularities in luminance, which would be caused in an area corresponding to the muntin 11B, by the action of the light quantity correction sheet 31 interposed between the reflection sheet 4 and the frame 11.

(4) Fourth embodiment

The fourth embodiment will be described with reference to FIG. 1 together with parenthesized reference numerals in FIG. 1. A surface light source device of side light type 40 in the fourth embodiment has a basic structure in common with the first embodiment. According to the features of the fourth embodiment, a frame 41 made of a black resin of high absorptance is employed, instead of the frame 11 made of the white resin, and a light quantity correction surface coated with silver ink 42A of high reflectance is formed on a reflection sheet 42. The silver ink 42A providing the light quantity correction surface is selectively coated on a surface of the reflection sheet opposite to the light guide plate 2 by means of printing so that an ink-coated portion overlaps with a muntin 41B of a frame 41.

In an area corresponding to the muntin 41B, illumination light tending to be transmitted through the reflection sheet 42 after having leaked out of the slope of the light guide plate 2 is reflected by the ink 42A and is then allowed to return to the light guide plate 2, before reaching to the muntin 41B.

When the surface light source device of side light type 40 is applied to a backlighting arrangement in a liquid crystal display panel, a reflective member such as an aluminum panel for radiating may be arranged on the rear of the surface light source device of side light type 40. This reflective member may forcibly return the illumination light having been transmitted through an aperture 41C to the light guide plate 2. In this case, a luminance level is intensified in an area of the aperture 41C more than an area of the muntin 41B.

The fourth embodiment of the present invention is fit for the above conditions. That is, by the action of the ink 42A of high reflectance, a quantity of illumination light allowed to return to the light guide plate 2 after having been reflected by the muntin 41B is intensified so as to decrease a difference between the quantity of illumination light allowed to return to the light guide plate 2 after having been reflected by the muntin and a quantity of illumination light allowed to return to the light guide plate 2 through an aperture portion between the muntins 41B.

As described above, according to the fourth embodiment of the present invention, since the ink selectively coated on the reflection sheet 42 by means of printing provides the light quantity correction surface, it is possible to avoid the irregularities in luminance, which are caused in an area corresponding to the muntin 41B by the action of the light quantity correction surface.

(5) Fifth embodiment

The fifth embodiment will be described with reference to FIG. 3 together with parenthesized reference numerals in FIG. 3. In a surface light source device of side light type in the fifth embodiment, a frame 45 is employed, instead of the frame 11 employed in the arrangement shown in FIG. 1. This frame 45 is similar in shape to that shown in FIG. 1, and is made of a black resin of high absorptance by means of injection molding.

A surface of a muntin 45B of the frame 45 facing a light guide plate 2 is coated with silver ink 46 by means of printing. The silver ink coated by means of printing provides a light quantity correction surface having a light reflection function. The frame 45 itself may be made of a light absorbable black resin, instead of the white resin.

(6) Sixth embodiment

A surface light source device of side light type in the sixth embodiment comprises a frame made of a black resin of high absorptance and a light quantity correction sheet. The sixth embodiment has the same structure, except for the frame and the light quantity correction sheet, as common with the third embodiment. Accordingly, the sixth embodiment will be described with reference to FIG. 4 together with parenthesized reference numerals 41, 51 respectively denoting the frame and the light quantity correction sheet.

The light quantity correction sheet 51 is made of a silver sheet material of high reflectance, and reflects illumination light having been transmitted through a reflection sheet 4. Thus, in the light quantity correction sheet 51, illumination light having been transmitted through any of an area of a muntin 41B and an area of an aperture 41C is allowed to return toward a light guide plate 2. Correction in quantity of illumination light is made by the action of the light quantity correction surface so that a quantity of illumination light allowed to return to the light guide plate 2 after having been reflected by the muntin 41B becomes approximately equal to a quantity of illumination light allowed to return to the light guide plate 2 through an aperture portion between the muntins 41B. The frame 41 itself may be made of a light absorbable black resin, instead of the white resin.

(7) Seventh embodiment

Figure 5:
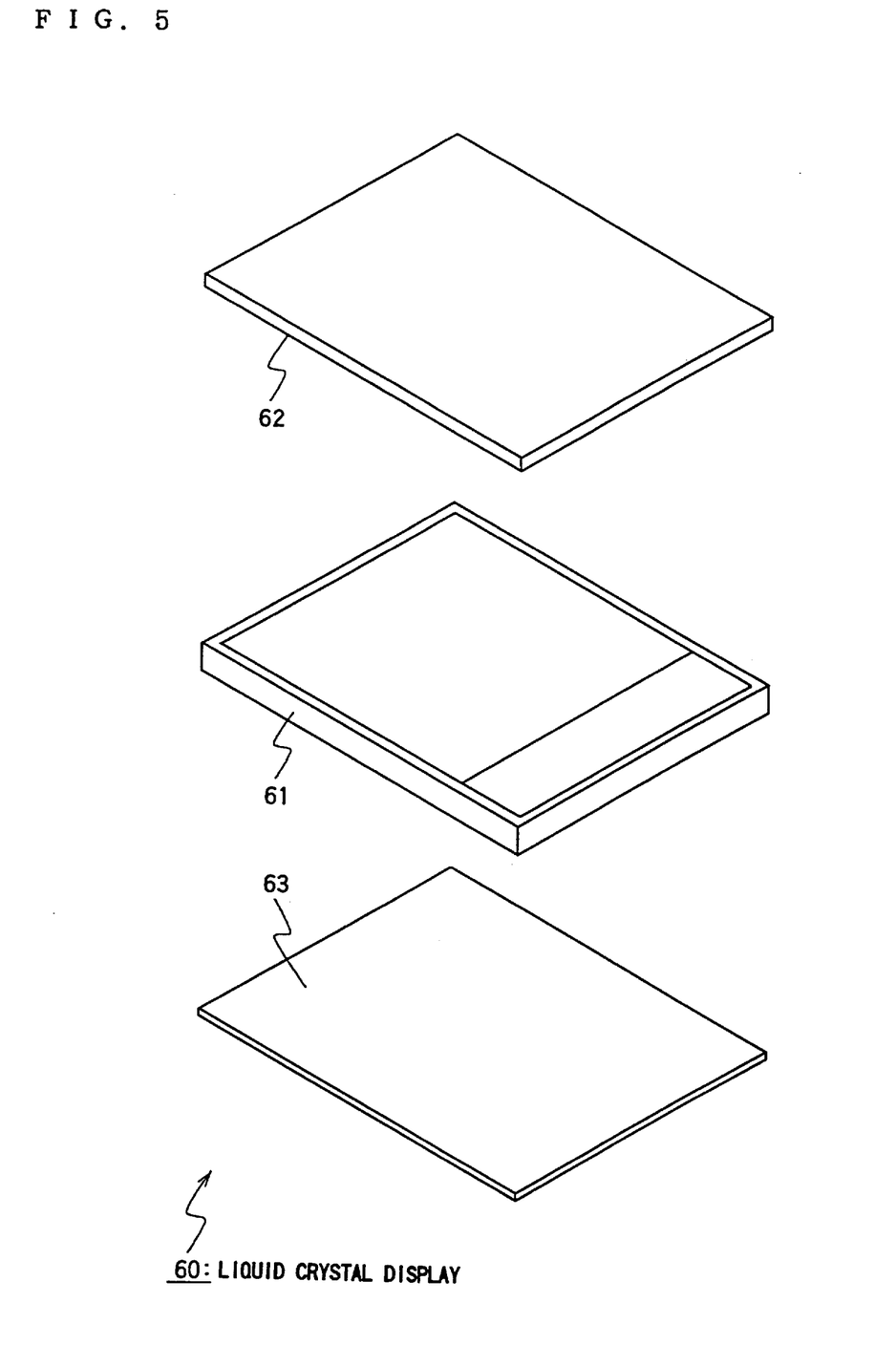
FIG. 5 is an exploded perspective view showing a liquid crystal display according to the seventh embodiment of the present invention.

FIG. 5 is an exploded perspective view showing a liquid crystal display according to the seventh embodiment. A liquid crystal display 60 comprises a liquid crystal display panel 62 arranged on the side of an emitting surface of a surface light source device of side light type 61. The liquid crystal display panel 62 is illuminated from the rear by the surface light source device of side light type 61. The surface light source device of side light type 61 has a structure in common with the surface light source device of side light type 1 as described with reference to FIG. 7, except that a frame of the surface light source device of side light type 61 is made of a black resin.

According to the features of the seventh embodiment, a light quantity correction member 63 is arranged on the rear of the surface light source device of side light type 61. The light quantity correction member 63 is made of a black sheet material effective in absorbing illumination light, and shields the illumination light coming to the light quantity correction member through an aperture of the frame so as to prevent the illumination light coming to the light quantity correction member through the aperture from reaching to a shield plate (not shown) arranged on the rear of the liquid crystal display 60. The frame itself may be made of a light absorbable black resin, instead of the white resin.

(8) Eighth embodiment

Figure 6:
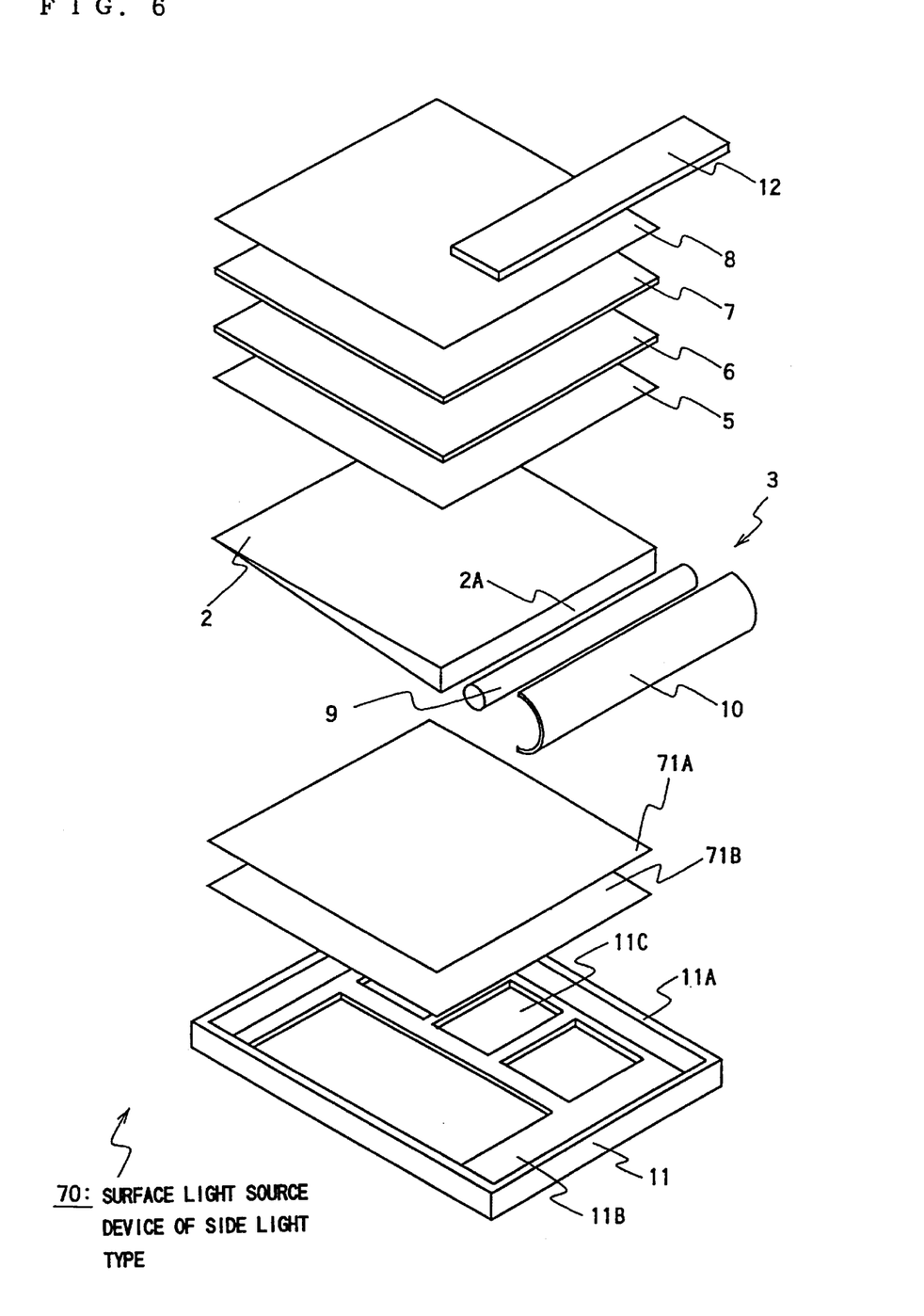
FIG. 6 is an exploded perspective view showing a liquid crystal display according to the eighth embodiment of the present invention.

FIG. 6 is an exploded perspective view showing a surface light source device of side light type according to the eighth embodiment. In a surface light source device of side light type 70, another reflection sheet 71B is laterally arranged on the outside (the side of a frame 11) of a light guide plate further than a reflection sheet 71A. The surface light source device of side light type in the eighth embodiment has other components and arrangement in common with the surface light source device of side light type shown in FIG. 7. According to the result of an experiment, irregularities in luminance caused along the muntin are reduced more satisfactorily by a reflection sheet composed of two pieces of laminated sheet materials, each of which is about 180 μm in thickness, than a piece of reflection sheet of a thickness (about 360 μm) equivalent to the total thickness of the above laminated sheet materials. It may be considered that the second reflection sheet 71B provides a light quantity correction surface.

That is, in the eighth embodiment, since the second reflection sheet is arranged in addition to the conventional arrangement (See FIG. 7) employing a piece of reflection sheet, this second reflection sheet functions as a light quantity correction surface, and as a result, it is possible to solve the problem of such irregularities in luminance caused in an area corresponding to the muntin as could not be prevented in the arrangement employing a piece of reflection sheet. In this case, the first reflection sheet 71A may be thinner than the conventional reflection sheet, and the second reflection sheet 71B may be equal in thickness to the first reflection sheet 71A.

(9) Other embodiments

It is to be understood that the above embodiments are not restrictive on the present invention. The following modifications, for instance, may be made in the present invention.

(a) In the first and fourth embodiments, the ink selectively coated on the surface of the reflection sheet on the side of the frame by means of printing in correspondence to the muntin provides the light quantity correction surface. However, the present invention is not limited to these embodiments.

It is also possible to form the light quantity correction surface by coating the surface of the reflection sheet on the side of the frame or the whole surface of the reflection sheet with ink by means of printing. It is also possible to form the light quantity correction surface by coating only part of portions corresponding to the muntin with the ink by means of printing. Further, the reflectance of gray ink to be coated by means of printing may be selectively determined according to the required degree of reflection. When it is necessary to substantially reduce the reflectance, black ink is also available.

(b) In the third and sixth embodiments, the light quantity correction surface is formed by interposing the white or black light quantity correction sheet. However, the present invention is not limited to these embodiments. For instance, it is also possible to use a light quantity correction sheet formed by selectively coating a black sheet material with white ink by means of printing. Otherwise, it is also possible to interpose a light quantity correction sheet of a color other than white and black. Further, a light quantity correction sheet formed by selectively coating a portion of a white sheet material in correspondence to the muntin of the frame, for instance, with gray or black ink by means of printing may provide the light quantity correction surface.

(c) In the seventh embodiment, the light quantity correction member providing the light quantity correction surface is made of the black sheet material. However, the present invention is not limited to the above embodiment. For instance, the light quantity correction member may be made of a black plate material. Further, a shield plate disposed on the rear may be colored in black, and the light quantity correction member may be made of such a shield plate itself.

(d) In the seventh embodiment, the frame is made of the black resin. However, the present invention is not limited to this embodiment. As long as it is possible to practically attain effective characteristics, the light quantity correction member may be formed by arranging the white sheet or plate material on the rear of a plate material, in case of using the frame made of a white resin, for instance.

(e) In the first to sixth embodiments, the frame itself as a mold product is not used to provide any light quantity correction surface. However, the present invention is not limited to these embodiments. For instance, a frame may be made of a resin of desired reflectance, and the surface of this frame may be used as the light quantity correction surface.

(f) In the above embodiments, any one of the components such as the reflection sheet serves as the light quantity correction surface. However, the present invention is not limited to these embodiments. For instance, the light quantity correction surface may be formed at a plurality of portions by a combination of these components.

(g) In the above embodiments, the frame made of the resin is employed. However, the present invention is not limited to these embodiments. For instance, it is also possible to use a frame made of aluminum.

(h) In the eighth embodiment, the sheet materials made of the white PET are laminatedly arranged. However, the present invention is not limited to this embodiment. It is also possible to laminatedly arrange sheets, on which silver is evaporated, or laminatedly arrange a silver sheet and a white PET sheet. Otherwise, it is also possible to laminatedly arrange sheet materials made of a material other than the silver and white PET sheets.

(i) In the eighth embodiment, two pieces of sheet materials are laminatedly arranged. However, the present invention is not limited to this embodiment. For instance, it is also possible to laminatedly arrange three or more pieces of sheet materials. Further, it is also possible to use a combination of sheet materials applied to the first to seventh embodiments at need.

(j) In the above embodiments, the diffusible surface is formed on the surface opposite to the emitting surface of the light guide plate. However, the present invention is not limited to these embodiments. For instance, it is also possible to form the diffusible surface on the emitting surface of the light guide plate. Otherwise, it is also possible to form the diffusible surface on both the emitting surface and its opposite surface.

(k) In the above embodiments, two pieces of prism sheets, each of which has one surface serving as a prism surface, is employed. However, the present invention is not limited to these embodiments.

It is also possible to arrange only a piece of prism sheet. Otherwise, it is also possible to arrange a so-called double-faced prism sheet having both surfaces respectively serving as prism surfaces. The present invention is also applicable to an arrangement using no prism sheet.

(l) In the above embodiments, the diffusible sheet, the prism sheets and the protection sheet of low diffusibility are arranged in sequence on the emitting surface of the light guide plate. However, the present invention is not limited to these embodiments. It is also possible to alter the arrangement of these sheet materials at need.

(m) In the above embodiments, the reflection sheet made of the white PET is employed. However, the present invention is not limited to these embodiments. For instance, it is also possible to use a regular reflective member such as a film, on which silver is evaporated, as the reflection sheet.

(n) In the above embodiments, illumination light is supplied through one end surface (the incidence surface) of the light guide plate. However, the present invention is not limited to these embodiments. It is also possible to supply the illumination light to a plurality of end surfaces (incidence surfaces).

(o) In the above embodiments, the rod-shaped light source is used as the primary light source. However, the present invention is not limited to these embodiments. For instance, it is also possible to use one or more point light sources such as light-emitting diodes, as the primary light source.

(p) In the above embodiments, descriptions have been given of the application of the present invention to the backlighting in the liquid crystal display. However, the present invention is not limited to these embodiments. It is also possible to generally apply the present invention to other surface light source devices of side light type such as illumination equipments and displays.

As has been described in detail, according to the surface light source device of side light type of the present invention, since the light quantity correction surface is arranged between the reflection member and the support member or on the rear of the support member, it is possible to cancel a difference in reflection characteristics between an area of a portion of the muntin in the support member and the other area and to effectively avoid the irregularities in luminance caused along the muntin so as to emit illumination light of high grade. Further, in accordance with the above fact, it is also possible to improve display quality of the display employing the surface light source device of side light type according to the present invention.

What is claimed is:

1. A surface light source device of side light type including a light guide plate having an emitting surface as one of major surfaces, a primary light source to supply light to the light guide plate through a lateral side thereof so as to allow light to emit through said emitting surface, a reflection sheet member arranged along the surface opposite to said emitting surface of said light guide plate and having a function to return light, which leaks out of said light guide plate through the surface opposite to said emitting surface, to said light guide plate, and a support member including a side plate to surround the lateral side of said light guide plate and a muntin connected to said side plate so as to support said light guide plate and said reflection member, comprising:

a light quantity correction surface to prevent irregularities in luminance from occurring on said emitting surface correspondingly to said muntin;

wherein said light quantity correction surface corrects at least one of a quantity of illumination light, which is transmitted through said reflection member and is then allowed to return to said light guide plate after having been reflected by said muntin, and a quantity of illumination light, which is allowed to return to said light guide plate without being reflected by said muntin, so as to allow the light leaking out of said light guide plate to uniformly return to said light guide plate.

2. A surface light source device of side light type according to claim 1, wherein said light quantity correction surface is formed by coating a surface of said reflection sheet member on the side of said muntin with ink of high absorptance by means of printing.

3. A surface light source device of side light type according to claim 2, wherein said ink is selectively coated by means of printing in correspondence to said muntin.

4. A surface light source device of side light type according to claim 1, wherein said muntin is made of a member of high reflectance, and said light quantity correction surface is formed by coating a surface of said muntin on the side of said reflection sheet with ink of high absorptance by means of printing.

5. A surface light source device of side light type according to claim 1, wherein said muntin is made of a member of high reflectance, and said light quantity correction surface is formed by interposing a sheet-like member of high absorptance between said reflection sheet and said muntin.

6. A surface light source device of side light type according to claim 1, wherein said muntin is made of a member of high reflectance, and said light quantity correction surface is formed by interposing a sheet-like member of partially high absorptance between said reflection sheet and said muntin.

7. A surface light source device of side light type according to claim 1, wherein said muntin is made of a member of low reflectance, and said light quantity correction surface is formed by coating a surface of said reflection sheet on the side of said muntin with ink of high reflectance by means of printing.

8. A surface light source device of side light type according to claim 7, wherein said ink is selectively coated by means of printing in correspondence to said muntin.

9. A surface light source device of side light type according to claim 1, wherein said muntin is made of a member of low reflectance, and said light quantity correction surface is formed by coating a surface of said muntin on the side of said reflection sheet with ink of high reflectance by means of printing.

10. A surface light source device of side light type according to claim 1, wherein said muntin is made of a member of low reflectance, and said light quantity correction surface is formed by interposing a sheet-like member of high reflectance between said reflection sheet and said muntin.

11. A surface light source device of side light type according to claim 1, wherein said muntin is made of a member of low reflectance, and said light quantity correction surface is formed by interposing a sheet-like member of partially high reflectance between said reflection sheet and said muntin.

12. A surface light source device of side light type according to claim 1, wherein a surface of said muntin itself provides said light quantity correction surface.

13. A surface light source device of side light type according to claim 1, wherein in addition to said reflection sheet member, another reflection sheet member is arranged on the side close to said muntin and provides said light quantity correction surface.

14. A display for illuminating an object to be illuminated by a surface light source device of side light type arranged on the rear of the substance to be illuminated, comprising:

the surface light source device including a light guide plate having an emitting surface as one of major surfaces, a primary light source to supply light to said light guide plate through a lateral side thereof so as to allow light to emit through said emitting surface, a reflection sheet member arranged along a surface opposite to said emitting surface of said light guide plate, and having a function to return light, which leaks out of said light guide plate through the surface opposite to said emitting surface, to said light guide plate, a support member including a side plate to surround the lateral side of said light guide plate and a muntin connected to said side plate so as to support said light guide plate and said reflection member, and a light quantity correction surface to prevent irregularities in luminance from occurring on said emitting surface correspondingly to said muntin;

wherein said light quantity correction surface corrects at least one of a quantity of illumination light, which is transmitted through said reflection member and is then allowed to return to said light guide plate after having been reflected by said muntin, and a quantity of illumination light, which is allowed to return to said light guide plate without being reflected by said muntin, so as to allow said light leaking out of said light guide plate to uniformly return to said light guide plate.

15. A display according to claim 14, wherein said light quantity correction surface is formed by coating a surface of said reflection sheet member on the side of said muntin with ink of high absorptance by means of printing.

16. A display according to claim 15, wherein said ink is selectively coated by means of printing in correspondence to said muntin.

17. A display according to claim 14, wherein said muntin is made of a member of high reflectance, and said light quantity correction surface is formed by coating a surface of said muntin on the side of said reflection sheet with ink of high absorptance by means of printing.

18. A display according to claim 14, wherein said muntin is made of a member of high reflectance, and said light quantity correction surface is formed by interposing a sheet-like member of high absorptance between said reflection sheet and said muntin.

19. A display according to claim 14, wherein said muntin is made of a member of high reflectance, and said light quantity correction surface is formed by interposing a sheet-like member of partially high absorptance between said reflection sheet and said muntin.

20. A display according to claim 14, wherein said muntin is made of a member of low reflectance, and said light quantity correction surface is formed by coating a surface of said reflection sheet on the side of said muntin with ink of high reflectance by means of printing.

21. A display according to claim 20, wherein said ink is selectively coated by means of printing in correspondence to said muntin.

22. A display according to claim 14, wherein said muntin is made of a member of low reflectance, and said light quantity correction surface is formed by coating a surface of said muntin on the side of said reflection sheet with ink of high reflectance by means of printing.

23. A display according to claim 14, wherein said muntin is made of a member of low reflectance, and said light quantity correction surface is formed by interposing a sheet-like member of high reflectance between said reflection sheet and said muntin.

24. A display according to claim 14, wherein said muntin is made of a member of low reflectance, and said light quantity correction surface is formed by interposing a sheet-like member of partially high reflectance between said reflection sheet and said muntin.

25. A display according to claim 14, wherein a surface of said muntin itself provides said light quantity correction surface.

26. A display according to claim 14, wherein in addition to said reflection sheet member, another reflection sheet member is arranged on the side close to said muntin and provides said light quantity correction surface.

* * * * *